United States Patent [19]

Hibler, Sr. et al.

[11] Patent Number: 4,738,099

[45] Date of Patent: Apr. 19, 1988

[54] BULKHEAD RUPTURE DISC FOR SOLID PROPELLANT MISSILES

[75] Inventors: Donald R. Hibler, Sr., Bates City; Stanley P. Sigle, Jr., Blue Springs, both of Mo.

[73] Assignee: Fike Corporation, Blue Springs, Mo.

[21] Appl. No.: 872,006

[22] Filed: Jun. 9, 1986

[51] Int. Cl.⁴ .......................... F02K 3/00; F02K 9/00
[52] U.S. Cl. ........................................ 60/245; 60/253; 60/256
[58] Field of Search .............. 60/245, 253, 256, 270.1, 60/39.1, 225, 250, 251

[56] References Cited

U.S. PATENT DOCUMENTS

| | | |
|---|---|---|
| 1,584,523 | 5/1926 | Egbert . |
| 2,523,068 | 9/1950 | Simpson et al. . |
| 2,842,937 | 7/1958 | Clark .................. 60/39.1 |
| 3,704,807 | 12/1972 | Lidgard . |
| 3,834,580 | 9/1974 | Ludwig et al. . |
| 3,888,079 | 6/1975 | Diesinger ............... 60/250 |
| 4,434,905 | 3/1984 | Ou et al. . |
| 4,505,180 | 3/1985 | Hinrichs . |

FOREIGN PATENT DOCUMENTS

2068090  8/1981  United Kingdom ............. 60/245

*Primary Examiner*—Louis J. Casaregola
*Assistant Examiner*—Timothy S. Thorpe
*Attorney, Agent, or Firm*—Hovey, Williams, Timmons & Collins

[57] ABSTRACT

A missile bulkhead rupture disc assembly for disposition between adjacent solid propellant stages which are ignited in sequential order has a central aperture which receives an igniter for detonating the first stage of propellant. In preferred forms, the rupture disc comprises a pre-bulged frangible element having a first burst pattern with a circular line of weakness circumscribing a central portion of the element surrounding the igniter, and the element also has a second burst pattern comprising a plurality of lines of weakness which extend in a radial direction outwardly from the circular line of weakness of the first burst pattern, and which are spaced from each other to define generally sector-shaped petals or segments of the frangible element. After ignition of the second stage of propellant, the frangible element initially bursts along the circular weakness line of the first burst pattern and thereafter ruptures along the radially extending lines of the second burst pattern to enable simultaneous, non-fragmenting outward movement of each of the segments toward the casing of the missile so that the materials discharged from the second propellant stage can be immediately directed to the tail end of the missile.

10 Claims, 1 Drawing Sheet

BULKHEAD RUPTURE DISC FOR SOLID PROPELLANT MISSILES

BACKGROUND OF THE INVENTION

1. Field of the Invention

This invention relates to a rupture disc of frangible material disposed between separate propellant chambers of a multi-stage missile, wherein a central portion of the frangible disc has an aperture for receiving an igniter and is circumscribed by a line of weakness to enable the central portion and the igniter to remain in fixed disposition as a plurality of sector-shaped segments surrounding the central portion simultaneously rupture when subjected to burst pressures and move outwardly for timed release of the next stage of propellants.

2. Description of the Prior Art

Missiles having motors that sequentially release separate stages of propellant are known to provide greater accuracy of control over the speed and destination of the missile then would be possible using, for instance, a single stage motor having propellants that burn on a continuous basis. For example, a first stage of a two-stage missile could be ignited for overcoming gravitational forces and initially launching the missile, and subsequently a second stage of solid propellant could be utilized to propel the missile to the target once the launch is complete. Multi-stage missiles can optionally use different propellants in each stage to further improve dynamic control of movement and thrust.

Rupture discs provide separation of propellants in adjacent fuel chambers of a multi-stage missile to enable to propellant in the stages to be ignited and released in a pulsed or sequential order. The rupture discs are typically pre-bulged and formed to complementally engage a backup support member disposed toward the upstream stage so that the disc will not collapse under the relatively large pressures that are generated during burning of the downstream stage. The backup support has internal passageways for enabling venting of the upstream stage once the latter is ignited and the rupture disc bursts. Moreover, the rupture disc can be provided with an insulating material such as synthetic rubber to prevent the disc from being subject to heat-related damage during combustion of propellants in the downstream stage.

As can be appreciated, the operating characteristics of a rupture disc assembly which separates adjacent stages of a solid propellant missile must meet stringent criteria to ensure satisfactory performance of the missile. The rupture disc assembly must completely isolate adjacent propellant chambers and must not fracture, crack or otherwise leak when subjected to the relatively large back pressures generated during burning of the propellant in the first stage, since such leakage might prematurely detonate the second or upstream stage. On the other hand, once ignition of the second stage is desired, it is important that the rupture disc move quickly out of the pathway of the escaping propellants and not fracture into small fragments that might otherwise become lodged in a position to obstruct the flow of materials from the second stage, since any flow obstruction might cause an explosion of the missile.

In the past, certain missile bulkhead rupture discs have been provided with radially extending, scored lines of weakness to facilitate rupturing of the disc in such a manner that a plurality of sector-shaped petals rupture and move outwardly toward the missile casing. In such missiles, wires from an electronic control apparatus which lead to an electric igniter for the first or downstream stage of propellants are secured to the missile casing and extend around the outside of the rupture disc. However, such an arrangement creates numerous difficulties, particularly in sealing the second stage from leakage of pressurized combustants in a path from the first stage along the area when the wires extend around the rupture disc, and hence a multitude of carefully prepared seals and welds are required in an effort to prevent such leakage. Moreover, use of two-part, modular casings is not possible in this type of construction, due to the complex seals and welds that must be provided to prevent leakage between the stages.

SUMMARY OF THE INVENTION

To overcome the foregoing disadvantages, the present invention provides a rupture disc assembly having a frangible circular element with a central portion that has an aperture for receiving a downstream stage igniter. Upon detonation of the upstream propellant stage, the central portion of the element remains in fixed disposition relative to the missile casing while six sector-shaped segments of the element simultaneously move outwardly without fragmenting for venting the combusting materials from the upstream stage.

More particularly, the frangible element of the rupture disc assembly has a first burst pattern with a line of weakness circumscribing the central portion of the element, which portion is preferably of a circular configuration. The element also has a second burst pattern comprising a plurality of weakness lines which extend radially outward from the weakness line of the first burst pattern. Each adjacent pair of the weakness lines of the second burst pattern are spaced from each other to define the generally sector-shaped segments of the element.

The weakness line of the first burst pattern is configured to rupture the frangible element along the first burst pattern before the element breaks along the second burst pattern to ensure that all of the sector-shaped segments move outwardly at substantially simultaneous times. Preferably, the weakness line of the first burst pattern is relieved of material by a deeper or wider score than is provided for the weakness lines which comprise the second burst pattern. As such, the segments will initially break away from the central portion, and then shift outwardly to leave the central portion in fixed disposition relative to the missile casing.

Advantageously, a flange circumscribing a portion of the igniter engages an annular backing member that is secured to the central portion of the element, and the backing member provides support for the central portion of the frangible element to ensure that the latter will initially rupture along the first burst pattern and to thereafter maintain the central portion in stationary disposition as the surrounding sector-shaped segments of the element shift outwardly toward the casing walls. The annular backing member is of a diameter slightly smaller than the diameter of the circular central portion so that the member sufficiently supports the central portion in fixed disposition without obstructing the movement of the surrounding segments when the element bursts. The flange of the igniter carries a small O-ring which sealingly engages the annular backing member to substantially preclude leakage of pressurized materials between the adjacent stages.

Disposition of a propellant igniter in a central portion of a bulkhead rupture disc enables the missile to be manufactured in small, modular portions that are easier to handle and work. Moreover, such a modular construction allows the use of pulsed motors having three or more stages, in comparison to previously known devices wherein installation of igniter electrical wire around the periphery of a bulkhead rupture disc could be accomplished, for all practical purposes, only in a missile where the number of propellant stages is limited to two.

DETAILED DESCRIPTION OF THE DRAWINGS

Figure 1:
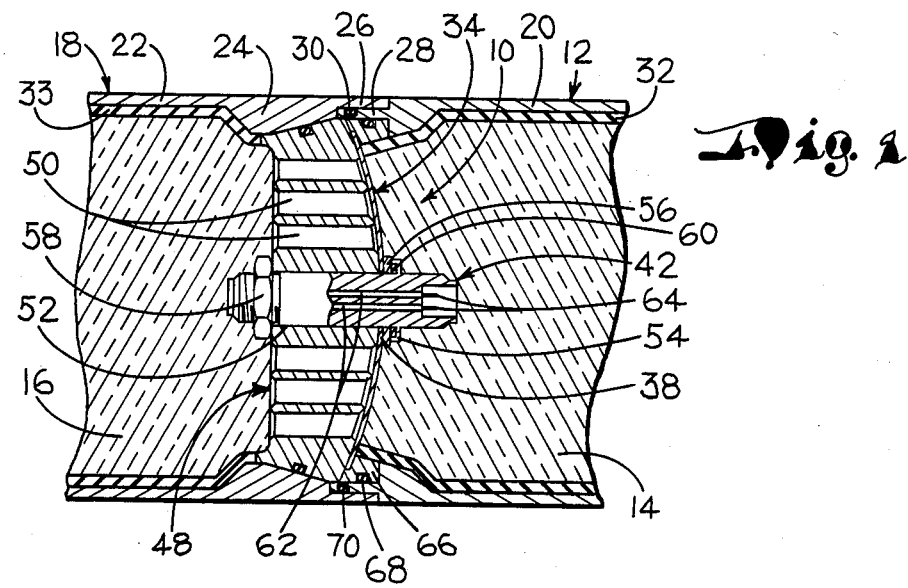
FIG. 1 is a fragmentary, side cross-sectional view of the bulkhead rupture disc assembly of the present invention, along with a missile casing and an electrically operable igniter to detonate propellant material in a first or downstream stage.

A bulkhead rupture disc assembly is designated broadly by the numeral 10 in FIGS. 1–4 and is advantageously utilized in a missile 12 for disposition between a first or downstream stage of propellant 14 and a second or upstream stage of propellant 16. The missile 12 has a generally cylindrical, tubular, elongated casing 18 which includes a casing section 20 carrying the first stage of propellant 14, and a casing section 22 which carries the second stage of propellant 16.

Figure 2:
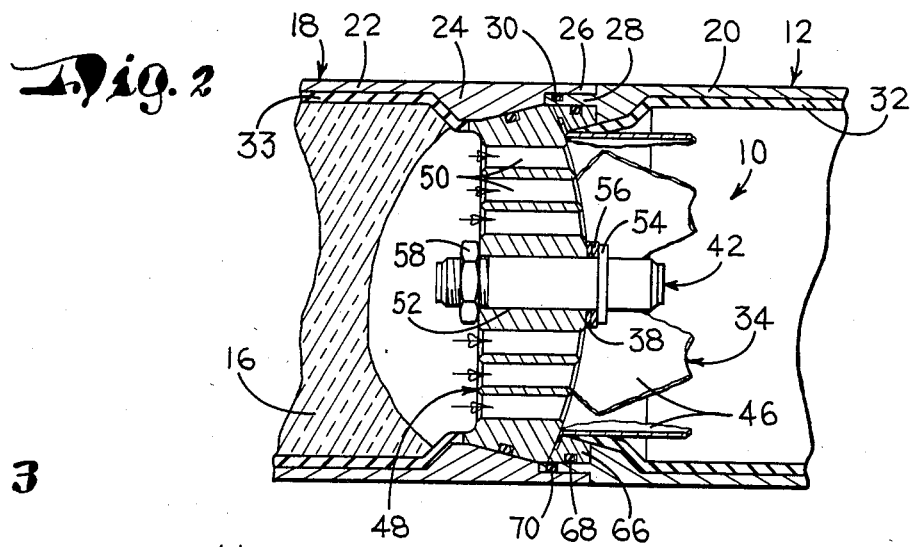
FIG. 2 is a view somewhat similar to FIG. 1 but illustrates the bulkhead disc assembly in a ruptured condition for enabling release of the materials from a second stage subsequent to burning of the first stage.

Viewing FIGS. 1 and 2, the second stage casing section 22 has an enlarged portion 24 that tapers to an outwardly extending flange portion 26 which matingly overlaps an outwardly extending flange portion 28 of the first stage casing section 20. An O-ring 30 disposed in a channel of the flange portion 28 prevents leakage between the flange portions 26,28.

A liner 32, optionally comprised of a synthetic rubber material, complementarily engages an interior surface of the first stage casing section 20 to define a chamber for carrying the first stage of propellant 14. Similarly, a liner 33 is disposed on an interior surface of the second stage casing section 22 to define a chamber for receiving the second stage of propellant 16.

Figure 3:
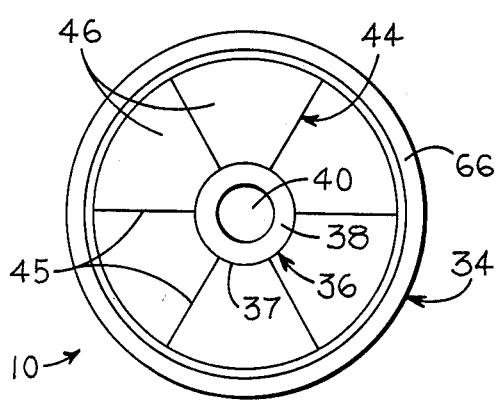
FIG. 3 is an end sectional view of only the rupture disc shown in FIG. 1 viewing the same from the downstream side.

The bulkhead rupture disc assembly 10 extends between the first stage of propellant 14 and the second stage of propellant 16 for enabling timed release of the second stage of propellant 16 subsequent to release of the first propellant stage 14. As best illustrated in FIG. 3, the assembly 10 includes a pre-bulged, frangible element 34 that is preferably comprised of a metalic material such as stainless steel, nickel or aluminum. The element 34 has a first burst pattern 36 with a circular line of weakness 37 that completely circumscribes a central portion 38 of the element 34. In turn, the central portion 38 has a circular aperture 40 concentric with the periphery of the central portion 38 for receiving an igniter assembly 42 therethrough, the latter of which is shown in FIGS. 1, 2 and 4.

The frangible element 34 of the disc assembly 10 also has a second burst pattern 44 which comprises a plurality of lines of weakness 45 which each extend in a substantially radial direction outwardy from the line of weakness 37 of the first burst pattern 36. Each adjacent pair of the lines of weakness 45 of the second burst pattern 44 are spaced from each other and define sector-shaped, frangible segments 46 of the element 34. The second burst pattern 44 as shown has six radially extending lines of weakness 45 to define six of the sector-shaped segments 46, although it is to be understood in this respect that the number of weakness lines of the second burst pattern 44 and the number of segments 46 defined thereby could be a value different than six if desired.

The line of weakness 37 of the first burst pattern 36 and the lines of weakness 45 of the second burst pattern 44 are preferably relieved areas of the element 34 that are formed by scoring both faces of the material comprising the element 34. The weakness line 37 of the first burst pattern 36 is scored to a depth deeper than the depth of score of the weakness lines 45 comprising the second burst pattern 44, for purposes which will be explained in more detail hereinafter.

Figure 4:
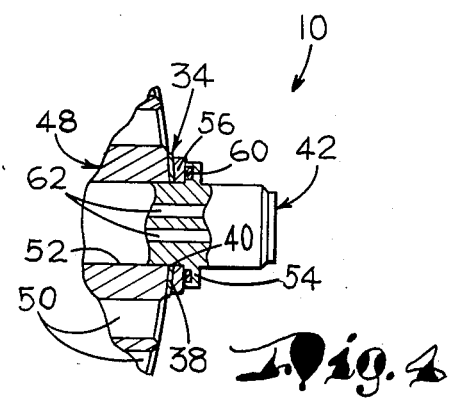
FIG. 4 is an enlarged, fragmentary, side sectional view of the rupture disc assembly after bursting as depicted in FIG. 2, particularly illustrating a flange on the igniter and an annular backing member which together support a central portion of the frangible rupture disc which remains stationary relative to the missile casing after the disc opens to vent materials from the upstream stage.

A circular, bulged support 48, as shown in FIGS. 1, 2 and 4, is comprised of a phenolic resinous material and lies in mating engagement with the upstream, concave surface of the frangible element 34. The phenolic support 48 has a number of passageways 50 which extend longitudinally in a direction parallel with the longitudinal axis of the casing 18, and also has an elongated channel 52 that is disposed in the middle of the support 48 in aligned relationship with the aperture 40 of the frangible element 34 for reception of the igniter assembly 42.

Referring now to FIG. 4, the igniter assembly 42 has an outwardly extending flange 54 that lies in engagement with an annular backing member 56 which, in turn, contacts the central portion 38 of the element 34. The backing member 56 has an external diameter slightly smaller than the diameter of the circular weakness line of the first burst pattern 36 which circumscribes the central portion 38. Preferably, the annular backing member 56 is securely fixed to the central portion 38 by means of an electron beam welding operation that is conducted completely around the circular periphery of the member 56.

As shown in FIGS. 1 and 2, a nut 58 is threadably received on a complementarily threaded portion of the igniter assembly 42 for urging the flange 54 in a direction to clamp the annular backing member 56 and the central portion 38 of the element 34 against the phenolic support 48. A small O-ring 60 disposed in a recess of the igniter flange 54 prevents leakage of materials in a pathway through the aperture 40 of frangible element 34.

Viewing FIG. 1, the igniter assembly 42 has a pair of wires 62 which are electrically connected to igniter electrodes 64 for detonating the first stage of propellant 14. Although not shown, the wires 62 extend through the threaded portion of the igniter assembly 42 and through the second stage of propellant 16 for electrical connection to an electronic control means (also not shown) that is located within a forward or head portion of the missile 12. Optionally, the igniter assembly 42 could also be provided with means for detonating the second stage of propellant 16 in an area adjacent the threaded portion of assembly 42.

As shown in FIGS. 1 and 2, the rupture disc assembly 10 has an enlarged flange 66 which extends around the periphery of the frangible element 34 and advantageously is fixed to the latter by means of an electron beam welding operation. The flange 66 has a groove for carrying an O-ring 68 that sealingly engages the outwardly extending flange portion 28 of the first stage casing section 20, for substantially precluding the leakage of materials along a path between the flange 66 and the first stage casing section 20. Additionally, the phenolic support 48 has a recess which carries an O-ring 70 for contact with the enlarged portion 24 of the second stage casing section 22, to thereby prevent leakage of materials along a path between the phenolic support 48 and the second stage casing section 22.

During operation of the missile 12, the first stage of propellant 14 is initially ignited by electrodes 64 of the igniter assembly 42, whereupon the first stage of propellant 14 combusts and gases are discharged through the tail end of missile 12. During burning of the first stage of propellant 14, the phenolic support 48 prevents collapse of the bulged frangible element 34 in a direction toward the second stage of propellant 16. A coating comprised of a material such as synthetic rubber can optionally be applied to the downstream side of the element 34 to protect the latter from heat-related damage during combustion of the first propellant stage 14.

As soon as the first stage of propellant 14 is substantially completely burned, the second stage of propellant 16 is ignited which causes a pressure wave to be directed through the passageways 50 in the phenolic support 48 and against the disc element 34. The frangible element 34 will then immediately rupture initially along the circular weakness line 37 of the first burst pattern 36 to enable the narrowed tip of each of the sector-shaped segments 46 to simultaneously detach from the circular central portion 38. Next, the element 34 will immediately thereafter simultaneously rupture along each of the six radially extending lines of weakness 45 of the second burst pattern 44. As a result, all of the sector-shaped segments 46 will instantaneously and simultaneously move outwardly from the position shown in FIG. 1 to the position depicted in FIG. 2 in generally parallel relationship to the casing 18 to enable the discharge of materials from the second stage of propellant 16 in the direction of the arrows shown in FIG. 2 and outwardly toward the tail end of the missile 12.

The weakness line 37 of the first burst pattern 36 is scored deeper than the weakness lines 45 of the second burst pattern 44 on one or both sides of the element 34 to ensure that all of the petal-shaped segments 46 will break away from the central portion 38 before rupturing along the lines of weakness 45 of the second burst pattern 44. As can be understood, the frangible material comprising element 34 will consequently have a rupture strength in the vicinity of the lines of weakness 45 of the second burst pattern 44 which is higher than the value of the rupture strength of the frangible material in the vicinity of the weakness line 37 of the first burst pattern 36. It has been found that such construction facilitates rapid, simultaneous opening of all of the segments 46 without fragmenting, so that portions of the frangible element 34 cannot become detached and subsequently obstruct the discharge of the second stage of propellants 16. It is essential that the frangible element 34 rupture initially along the weakness line 37 of the first burst pattern 36 so that all of the segments 46 will simultaneously open. Otherwise, opening of less than all of the segments in such a rupture disc can cause the escaping gases to provide a thrust which directs the missile away from its intended course.

The bulkhead rupture disc assembly 10 of the present invention greatly facilitates the construction of the missile 12, since the latter can be built in modular construction and have three or more stages if desired. Moreover, placement of the igniter assembly 42 through the center of the frangible element 34 reduces the overall diameter of the missile casing 18 compared to known construction, since previously enlarged casing portions located externally of the rupture disc were necessary for completely enclosing the wires of the igniter leading to the first stage while providing sufficient structure for attempting to effect a seal against leakage between the first and second stage along the igniter wire.

Those skilled in the art may appreciate that various details of construction of the present invention may be modified from those specifically disclosed as exemplary and currently preferred, without departing from the essence of the invention. For instance, other means are possible for ensuring that the frangible element 34 bursts along the weakness line 37 of the first burst pattern 36 before rupturing along the weakness lines 45 of the second burst pattern 44, such as a change in composition of the material comprising the element 34, or possibly scored lines that vary in width instead of depth. Also, the central portion 38 may have a configuration other than circular, such as for instance a star-shaped pattern with pointed tips that converge toward the radially extending weakness lines of a second burst pattern. Accordingly, it is to be understood that the invention should be deemed limited only by the fair scope of the claims which follow, when the latter are reasonably interpreted to encompass manifest mechanical equivalents.

We claim:

1. A missile bulkhead rupture disc assembly for disposition between a first stage of propellant and a second stage of propellant and for enabling release of said second stage of propellant subsequent to release of said first stage of propellant, said disc assembly comprising:

a generally circular element comprised of a frangible material and having a first burst pattern with a line of weakness completely circumscribing a central portion of said element, said central portion of said element having structure defining an aperture, said element having a second burst pattern comprising a plurality of lines of weakness each extending in a substantially radial direction outwardly from said line of weakness of said first burst pattern, each adjacent pair of said lines of weakness of said second burst pattern being spaced from each other and defining generally sector-shaped segments of said element, said frangible material of said element having a tensile strength of a certain, first value in the vicinity of said line of weakness of said first burst pattern, said frangible material of said element having a tensile strength in the vicinity of said lines of weakness of said second burst pattern of a second value which is higher then said first certain value.

2. The rupture disc assembly as set forth in claim 1, wherein said line of weakness of said first burst pattern is essentially circular.

3. The rupture disc assembly as set forth in claim 1, wherein said lines of weakness of said second burst pattern are equally spaced around said element.

4. The rupture disc assembly as set forth in claim 1, wherein said line of weakness of said first burst pattern and said lines of weakness of said second burst pattern comprise relieved areas scored in said element.

5. The rupture disc assembly as set forth in claim 4, wherein said weakness line of said first burst pattern is scored to a deeper depth in said element than the depth of score of said lines of weakness of said second burst pattern.

6. The rupture disc assembly as set forth in claim 1, including flange means extending around the periphery of said element and having walls defining a channel for receiving an O-ring for sealing said element to a bulkhead assembly.

7. The rupture disc assembly as set forth in claim 1, including an annular backing member in engagement with said central portion of said element and having a configuration of a size no greater than said central portion for supporting said igniter assembly.

8. A missile bulkhead assembly disposed within a missile casing comprising:
a support extending substantially across said casing and having a plurality of passageways as well as a generally centrally disposed channel extending therethrough;
a generally circular element comprised of a frangible material and extending substantially across said casing in contact with said support and having structure defining a generally centrally disposed aperture located in aligned relationship with said channel; and
a propellant stage igniter extending through said aperture of said frangible element and disposed at least partially in said channel,
said frangible element having a first burst pattern with a line of weakness surrounding said aperture, defining a central portion of said element between said line of weakness of said first burst pattern and said aperture,
said igniter being secured to said central portion,
said element having a second burst pattern comprising a plurality of lines of weakness each extending in a substantially radial direction outwardly from said line of weakness of said first burst pattern,
each adjacent pair of said lines of weakness of said second burst pattern being spaced from each other and defining generally sector-shaped segments of said element,
said frangible material of said element having a tensile strength of a certain, first value in the vicinity of said line of weakness of said first burst pattern,
said frangible material of said element having a tensile strength in the vicinity of said lines of weakness of said second burst pattern of a second value which is higher than said first certain value.

9. The bulkhead assembly as set forth in claim 8, wherein said ignitor includes an outwardly extending flange, and said central portion of said element is disposed substantially between said flange and said support.

10. The bulkhead assembly as set forth in claim 9; including a generally annular-shaped backing member secured to said central portion of said element substantially between said flange and said support.

* * * * *